US009072650B2

(12) United States Patent
Kim

(10) Patent No.: US 9,072,650 B2
(45) Date of Patent: Jul. 7, 2015

(54) SYSTEM AND METHOD FOR GUIDING THE WALKING DIRECTION OF THE VISUALLY IMPAIRED USING RFID BLOCKS

(75) Inventor: Sung Jae Kim, Daegu (KR)

(73) Assignee: Pusung Recycling Co., Ltd., Daegu (KR)

( * ) Notice: Subject to any disclaimer, the term of this patent is extended or adjusted under 35 U.S.C. 154(b) by 384 days.

(21) Appl. No.: 13/817,615

(22) PCT Filed: Jan. 5, 2011

(86) PCT No.: PCT/KR2011/000050
§ 371 (c)(1),
(2), (4) Date: Feb. 19, 2013

(87) PCT Pub. No.: WO2011/083963
PCT Pub. Date: Jul. 14, 2011

(65) Prior Publication Data

US 2013/0200992 A1 Aug. 8, 2013

(30) Foreign Application Priority Data

Jan. 6, 2010 (KR) ........................ 10-2010-0000875

(51) Int. Cl.
*G09B 21/00* (2006.01)
*A61H 3/06* (2006.01)

(52) U.S. Cl.
CPC ................ *A61H 3/061* (2013.01); *A61H 3/066* (2013.01); *A61H 3/068* (2013.01); *A61H 2201/5097* (2013.01)

(58) Field of Classification Search
CPC ....... A61H 3/061; A61H 3/066; A61H 3/068; A61H 2201/5097
See application file for complete search history.

(56) References Cited

U.S. PATENT DOCUMENTS

2003/0032590 A1* 2/2003 Dieterich ........................ 514/12
2005/0099306 A1* 5/2005 Gilfix et al. ................ 340/573.1

(Continued)

FOREIGN PATENT DOCUMENTS

| | | |
|---|---|---|
| JP | 2002-024983 | 1/2002 |
| JP | 2003-091794 | 3/2003 |
| JP | 2005-245535 | 9/2005 |
| JP | 2009-219509 | 10/2009 |
| KR | 10-2006-0068273 | 6/2006 |
| KR | 10-2006-0094554 | 8/2006 |
| KR | 20-20090001830 | 2/2009 |
| KR | 10-0919790 | 10/2009 |

OTHER PUBLICATIONS

International Search Report for PCT/KR2011/000050 mailed Sep. 30, 2011.

*Primary Examiner* — Ojiako Nwugo
(74) *Attorney, Agent, or Firm* — Andrus Intellectual Property Law, LLP

(57) ABSTRACT

The present invention relates to a system and method for guiding the walking directions of a blind person using RFID blocks and, more particularly, to a system and method for guiding the walking directions of a blind person using RFID blocks, wherein an RFID reader wirelessly senses RF tags embedded in the blocks so as to guide walking directions by means of vibrations, buzzer sounds, and voice messages for guiding entry/exit directions, according to the types of pedestrian zones when a blind person walks along the blocks. The guiding system comprises: RFID tags for guiding the walking of a blind person; a plurality of blocks embedded in sidewalks which are divided into a junction zone block, a junction neighboring zone block and a general pedestrian zone block; a walking cane for receiving pedestrian zone information from the RFID tags in the plurality of blocks and outputting vibrations, sound effects and voice messages for guiding walking directions. The walking cane comprises: an antenna for receiving the pedestrian zone information by means of the RFID tags and a wireless transceiver; and a control part for generating vibrations when the blind person passes a general pedestrian zone block, generating vibrations and buzzer sounds when the blind person passes a junction neighboring zone, outputting vibrations and a voice guiding message for indicating a junction zone block when the blind person passes, and outputting vibrations and a voice guiding message for entry/exit directions when the blind person passes the junction neighboring zone block via the junction zone block.

7 Claims, 5 Drawing Sheets

(56) References Cited

U.S. PATENT DOCUMENTS

| | | | | |
|---|---|---|---|---|
| 2005/0099307 | A1* | 5/2005 | Gilfix et al. | 340/573.1 |
| 2005/0099318 | A1* | 5/2005 | Gilfix et al. | 340/825.19 |
| 2006/0289624 | A1* | 12/2006 | Olmos et al. | 235/375 |
| 2008/0107481 | A1* | 5/2008 | Donald et al. | 404/9 |
| 2008/0278294 | A1* | 11/2008 | Konuma | 340/10.41 |
| 2009/0032590 | A1* | 2/2009 | Hopkins | 235/385 |
| 2009/0224934 | A1* | 9/2009 | Medley | 340/825.19 |
| 2010/0109918 | A1* | 5/2010 | Liebermann | 341/21 |
| 2011/0148652 | A1* | 6/2011 | Kim et al. | 340/691.1 |
| 2012/0279539 | A1* | 11/2012 | Kim | 135/66 |

* cited by examiner

SYSTEM AND METHOD FOR GUIDING THE WALKING DIRECTION OF THE VISUALLY IMPAIRED USING RFID BLOCKS

RELATED APPLICATIONS

This application is a 371 application of International Application No. PCT/KR2011/000050, filed Jan. 5, 2011, which in turn claims priority from Korean Patent Application No. 10-2010-0000875, filed Jan. 6, 2010, each of which is incorporated herein by reference in its entirety.

CROSS-REFERENCE TO RELATED APPLICATION

This application claims the benefit of Korean Patent Application No. 10-2010-0000875, filed on Jan. 6, 2010 in the Korean Intellectual Property Office, the disclosure of which is incorporated herein by reference.

TECHNICAL FIELD

The present invention relates to a system and a method for guiding the walking direction of a blind person using RFID blocks, and more particularly, to a system and a method for guiding the walking direction of a blind person using RFID blocks, which can guide a walking direction by means of vibrations, buzzer sounds, or/and entry and exit direction voice messages depend on the types of pedestrian zones, as a blind person walks along the blocks and wirelessly senses RF tags embedded in the blocks by using an RFID reader.

BACKGROUND ART

To generally walk for blind person to a desired place, the blind person have to both detect a protrusion of the induction blocks paved in the sidewalk using a walking cane in order to perceive an obstacle around the current place and walk to a desired place. These conventional methods could not accurately provide the desired current location information and the walking direction to the blind person. If a blind person goes to a specific location for the first time, someone have to guide the location or inform the location information since the blind person is only obtained from neighbors for the corresponding location information.

Until to present time, a plurality of induction blocks are paved in the middle of the sidewalk to inform the warning state and guide to the specific location in a crosswalk, a subway passenger door, a stair or etc.

The conventional induction blocks are, however, used as a rubber, a stainless steel, a plastic, or a porcelain tile, which are different with the general flooring materials, and the blind person may perceive the protruding portion of the induction block by using the walking cane or the his or her feet. In addition, the blind person may perceive the surroundings through the sounds and sensations generated and sensed as the blind person touches the obstacle or drags on the blocks using his or her walking cane.

At this time, the blind person may sensuously perceive the obstacle only through a protruding shape paved in the baille blocks for touching with the walking cane. In this way, there are 3 types of messages that will be perceived by the shape of the protruding shape. When the blind person actually walks to the desired location, there are problems that the blind person may perceive the 3 types of message slowly or inaccurately.

Up to now, the location information for providing to the blind person is tactile information such as baille plates and auditory information such as voice and sound. The auditory information is quickly and accurately transmitted compared to the tactile information. Recently, techniques of receiving the location information obtained for oneself have been studied.

On the other hand, as a prior art of a walking guide mechanism for a blind person, it is disclosed in Korean utility model registration No. 20-0203332, which includes an ultrasonic generating device and a vibrating device in a walking cane, wherein the ultrasonic generating device perceives the obstacle by using the ultrasonic wave and the vibrator is vibrated when the obstacle is perceived, thereby the walking guide mechanism can inform the obstacle information to the blind person. The ultrasonic generating device can easily perceive the obstacle placed in near to guide to the desired direction for the blind person. There is a problem that the blind people may be confused in a place where many people is crowded in the specific place since the walking guide mechanism can not be able to distinguish between the obstacles and people.

To solve the problems of the prior technology, it is disclosed in Korean Registered Patent No. 10-0647069, which can perform voice guidance by reading the location information with a non-contact manner from RFID tags which are embedded into the blocks, respectively. That is, two functions are further included to this technology of both detecting the reflecting induction path in the cane regardless of contact and non-contact manner by forming an infrared reflection path in an induction path and guiding the walking direction by moving up, down, left, or right direction of the walking cane.

In a walking guidance system for a blind person disclosed in Korean Registered Patent No. 10-0647069, since both the RFID tags are embodied into the blocks of the sidewalk and a RFID reader is installed in the lower part of the walking cane, the location information for up, down, left, or right directions is guided with voice information by emitting radio signals through an antenna of the RFID reader installed in the cane and reading the location information from the RFID tag embedded in a near block, as the blind person walks to the desired place.

The walking guidance system for the blind person still have problems that of: (1) not guiding the way in detail to the desired place but simply presenting up, down, left, or right directions at a junction in the road; (2) not normally guiding the way when the walking guidance system is not exactly detected the blind person in the result of confusing up, down, left, or right direction based on the entered direction; and (3) not easily perceiving that how far away the junction and the danger area from the blind person or how can find the exact walking direction to reach the desired place.

DISCLOSURE OF INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a system and a method for guiding the walking direction of a blind person using RFID blocks, which can guide walking direction by means of vibrations, buzzer sounds, or/and entry and exit direction voice messages for a junction zone block, a junction neighboring zone block and a general pedestrian zone block when the blind person walks along the blocks and swings the cane in up, down, left, or right directions to wirelessly senses RF tags embedded in the blocks, and guide the danger area by not outputting any one of vibration, buzzer sound, or/and entry and exit direction voice message when the blind person drift off the any one zone block of the junction zone block, a junction neighboring zone block and a general pedestrian zone block.

Accordingly, the present invention is made to overcome the above mentioned problems, and an aspect of the present invention, a system for guiding a walking direction of a blind person by using RFID blocks, the system comprises: a plurality of blocks having RFID tags embedded therein, the block being paved in a sidewalk and divided into a junction zone block, a junction neighboring zone block and a general pedestrian zone block; and a walking cane for perceiving a walking guidance information from the junction zone block, the junction neighboring zone block or the general pedestrian zone block and selectively outputting a vibration signal, a sound effect or voice guidance message for guiding a walking direction;

wherein the walking cane comprises: an antenna for receiving the walking guidance information from the junction zone block, the junction neighboring zone block or the general pedestrian zone block by means of wireless communication with the RFID tags; a RF signal detector for detecting and outputting information of the junction zone block, the junction neighboring zone block or the general pedestrian zone block received from the antenna; an A/D conversion unit for converting the detected signal from the RF signal detector into a digital signal; a control unit for receiving the junction zone block, the junction neighboring zone block or the general pedestrian zone block which is converted into the digital signal in the A/D conversion unit, controlling to generate the vibration when the blind person walks through the general pedestrian zone block, controlling to generate both the vibration and the sound effect when the blind person walks through the junction neighboring zone, controlling to generate both the vibration and the voice guidance message announcing the junction zone block, when the blind person walks through the junction zone block, and controlling to generate both the vibration and the voice guidance message for an entry or exit direction, when the blind person walks through the junction neighboring zone block via the junction zone block; a voice memory for storing the voice guidance message for the entry or exit direction; an audio processing unit for speech-signal processing and outputting the voice messages stored in the voice memory by controlling the control unit; an earphone for outputting an audio signal for the voice guidance message outputted from the audio processing unit; a vibrator for generating the vibration by controlling the control unit; and a buzzer for generating the sound effects by controlling the control unit.

According to another aspect of the present invention, a method for guiding the walking direction of the blind person by using RFID blocks in an walking direction guidance system having a plurality of blocks having the RFID tags embedded therein, paved in a sidewalk and divided into a junction zone block, a junction neighboring zone block and a general pedestrian zone block, and a walking cane for perceiving a walking guidance information from the junction zone block, the junction neighboring zone block or the general pedestrian zone block and selectively outputting a vibration signal, a sound effect or voice guidance message for guiding a walking direction, the method comprising the steps of: generating the vibration signal when the blind person walks through the general pedestrian zone block in the plurality of blocks; generating both the vibration signal and the sound effects when the blind person walks through the junction neighboring zone block after passing through the general pedestrian zone block in the plurality of blocks; generating both the vibration signal and the voice guidance message for informing the junction zone block when the blind person walks through the junction zone block in the plurality of blocks; generating both the vibration signal and the voice guidance message of an entry or exit direction when the blind person walks through the junction neighboring zone block after passing the junction zone block in the plurality of blocks; and generating the vibration signal when the blind person walks through the general pedestrian zone block in the plurality of blocks.

The method further comprising a step of: generating the vibration signal and the sound effects when the blind person has passed any one junction neighboring zone block and enters any other junction neighboring zone block without entering the junction zone block.

The method further comprising a step of: resetting the walking cane as a initial state when the blind person does not enter to the junction neighboring zone block during a predetermined time after passing through the junction zone block in a state of drifting off the junction zone block.

The method further comprising a step of: resetting the walking cane as a initial state when the blind person does not enter to the general pedestrian zone block and other junction neighboring zone block during a predetermined time after passing through the junction neighboring zone block in a state of drifting off the junction neighboring zone.

Advantageous Effects

Thus, according to a preferred embodiment of the present invention, the system and the method for guiding the walking direction of the blind person using RFID blocks, have technical merits as follows. When the blind person walks along the blocks and moves the walking cane move up, down, left, or right direction, the RFID reader installed in the walking cane may sense the junction zone block, or the cane output the effect sounds if the blind person closes to the junction zone block. But the blind person reaches to the junction zone block, the cane outputs voice information for informing the junction zone block. In addition, if the blind person reaches to the junction neighboring zone, the cane generates both the vibration signal and outputs voice information for informing the entry and exit junction direction in order to exactly guide for the blind person to the desired walking direction without peoples assistance.

BEST MODES FOR CARRYING OUT THE INVENTION

Figure 1:
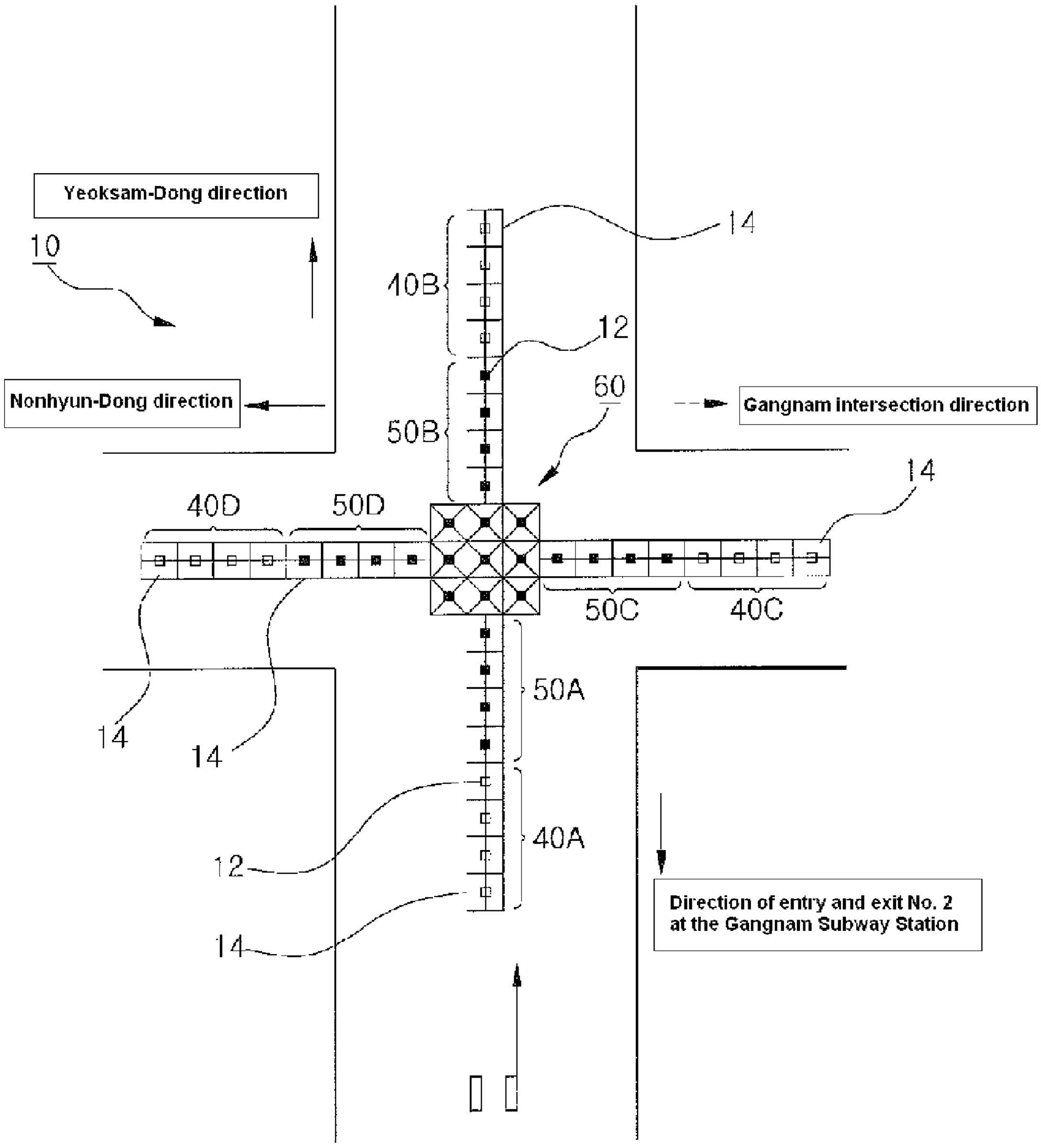
FIG. 1 is an explanation view of a sidewalk of a blind person and a cross(+)-type of a sidewalk having a plurality of blocks where RFID tags embedded therein according to a preferred embodiment of the present invention.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is an explanation view of a sidewalk of a blind person and a cross(+)-type of a sidewalk a plurality of blocks where RFID tags embedded therein according to a preferred embodiment of the present invention.

Figure 2:
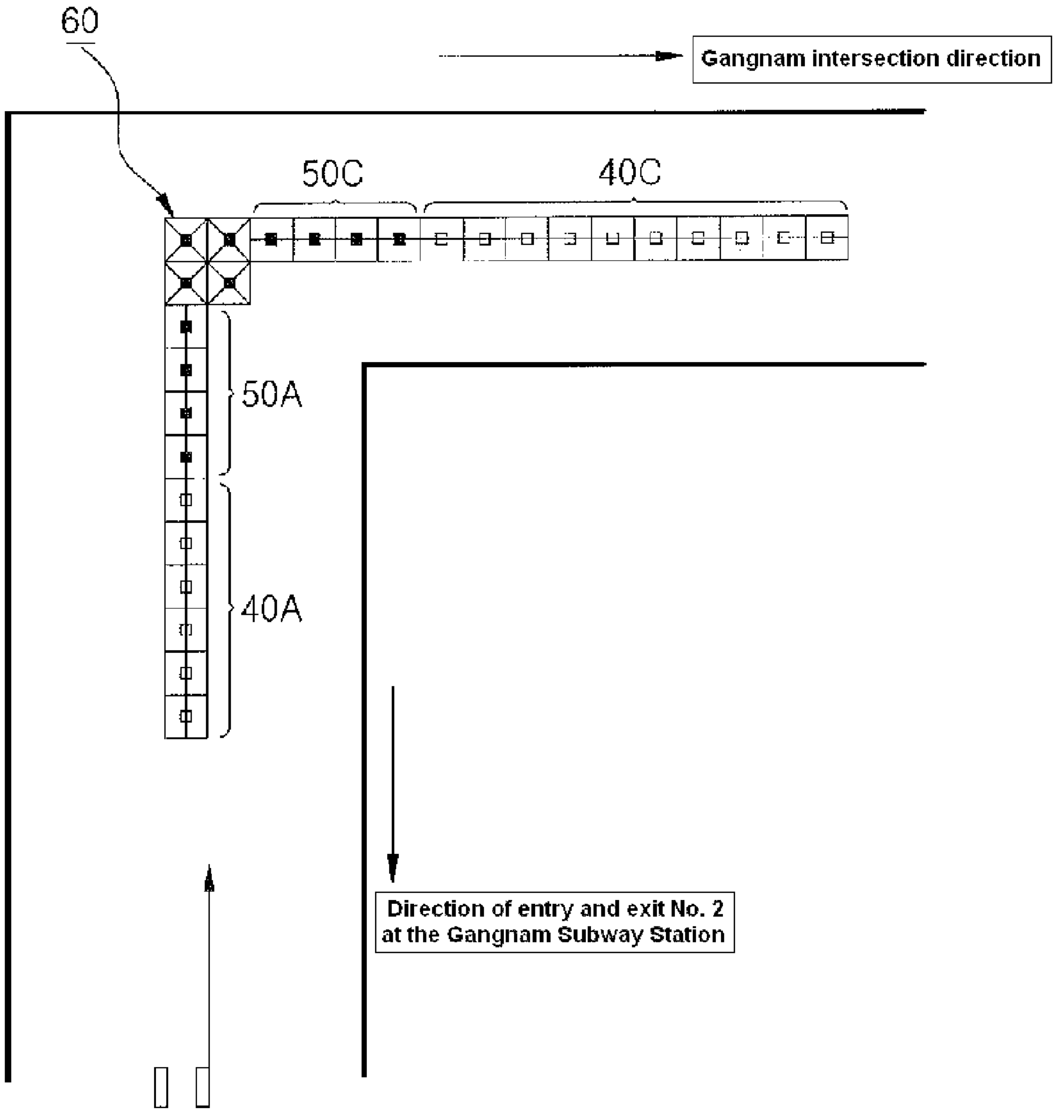
FIG. 2 is an explanation view of a sidewalk of a blind person and a T-type of a sidewalk having a plurality of blocks where RFID tags embedded therein according to a preferred embodiment of the present invention.

FIG. 2 is an explanation view of a sidewalk of a blind person and a T-type of a sidewalk having a plurality of blocks where RFID tags embedded therein according to a preferred embodiment of the present invention.

Figure 3:
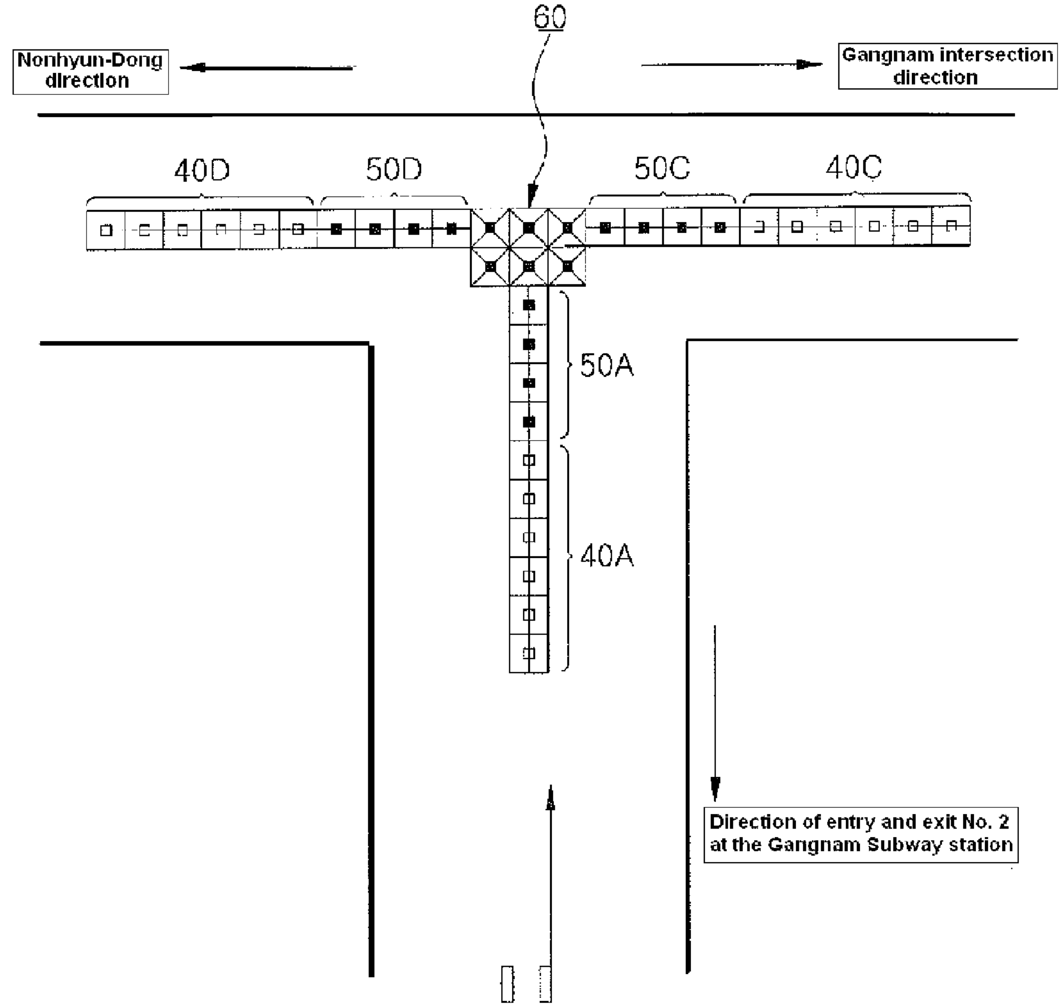
FIG. 3 is an explanation view of a sidewalk of a blind person and a ¬ -type of a sidewalk having a plurality of blocks where RFID tags embedded therein according to a preferred embodiment of the present invention.

FIG. 3 is an explanation view of a sidewalk of a blind person and a ¬ -type of a sidewalk having a plurality of blocks where RFID tags embedded therein according to a preferred embodiment of the present invention.

A plurality of blocks 14 having RFID tags 12 embedded therein are paved in the sidewalk 10 to guide the walking direction for a blind person. The blocks 14 are continuously paved in the sidewalk 10 by the specific locations, that is, the location of guiding the walking direction for the blind person. Then, by installing the RFID tag 12 into the block of the sidewalks, the blind people may receive the location information from the RFID tag 12 while walking along the sidewalk 10, thereby the blind people may receive the voice information for the location information.

Figure 4:
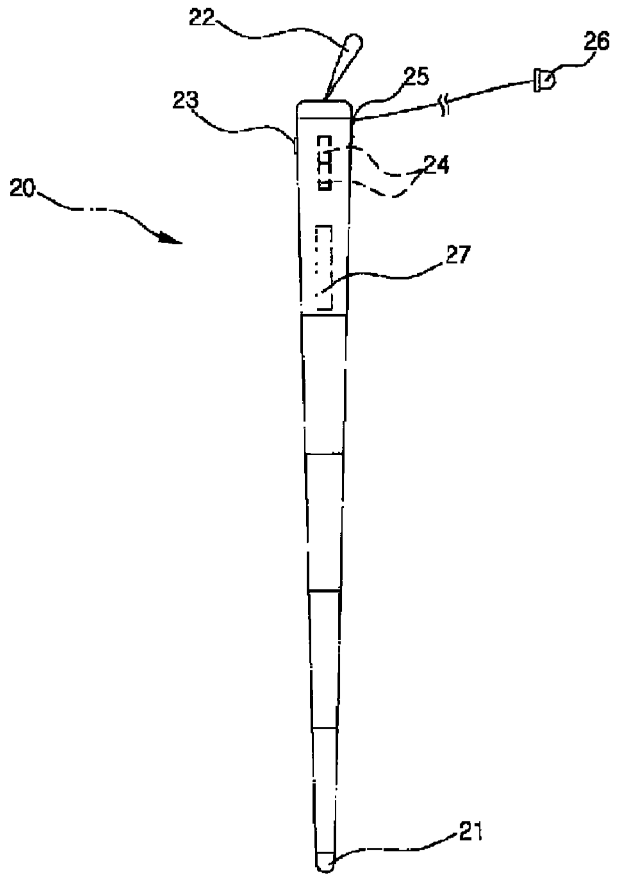
FIG. 4 is an overview of a cane for sensing an induction path according to a preferred embodiment of the present invention.

FIG. 4 is an overview of a cane for sensing an induction path according to a preferred embodiment of the present invention.

A walking cane 20 of the present invention includes an antenna 20 for receiving information of the RFID tags embedded into the blocks 14, a hanger string 22 installed on a top end of the walking cane 20 and for hanging onto the wrist of the blind person, a vibrator 23 for generating the vibration in order to perceive a state of the walking induction guidance for the blind person, a battery 24 for supplying the electric power to each electronic device, an earphone jack 25 installed on a top of the walking cane 20 and connected to be listened for the blind person the walking guidance message, an earphone 26 connected to the earphone jack 25 and for listening the walking guidance message, and a circuit board 27 having each electronic device.

Figure 5:
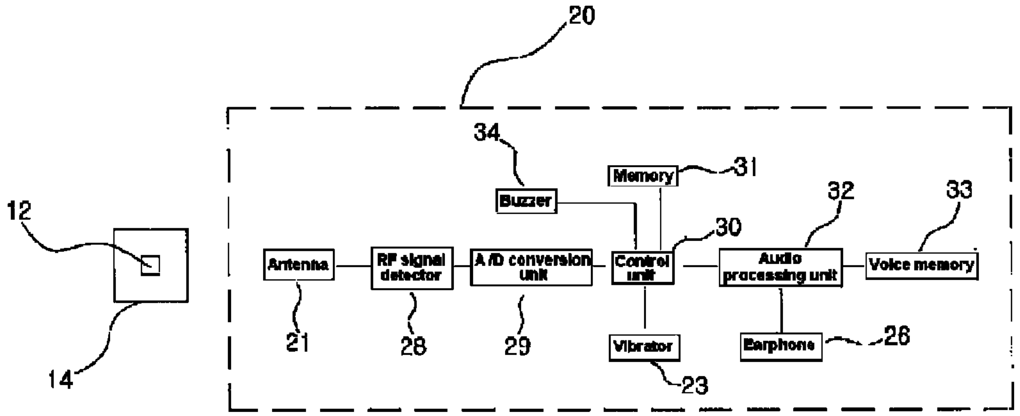
FIG. 5 is a block diagram of a system for guiding the walking direction of the blind person according to a preferred embodiment of the present invention.

FIG. 5 is a block diagram of a system for guiding the walking direction of the blind person according to a preferred embodiment of the present invention.

The system for guiding the walking direction of the blind person according to the preferred embodiment of the present invention includes a plurality of blocks 14 paved in a sidewalk 10, and a walking cane 20 for perceiving a walking guidance information from the plurality of blocks 14 and outputting both vibration signal and voice guidance message.

A RFID tag 12, in which the location information per each place is stored, is embedded on each block 14 which is paved in the sidewalk 10 to be able to access with the walking cane by a non-contact manner. The plurality of blocks 14 may be paved in the sidewalk 10, a synthetic resin or the like.

The walking cane 20 includes an antenna 21 for receiving the walking guidance information from a junction zone block, a junction neighboring zone block or a general pedestrian zone block by means of wireless communication with the RFID tags 12; a RF signal detector 28 for detecting and outputting information of the junction zone block, the junction neighboring zone block or the general pedestrian zone block received from the antenna 21; an A/D conversion unit 29 for converting the detected signal from the RF signal detector 28 into a digital signal; a control unit 30 for receiving the junction zone block, the junction neighboring zone block or the general pedestrian zone block which is converted into the digital signal in the A/D conversion unit 29, controlling to generate the vibration when the blind person walks through the general pedestrian zone block, controlling to generate the vibration and the sound effects when the blind person walks through the junction neighboring zone, controlling to generate the vibration and the voice guidance message for informing the junction zone block, when the blind person walks passing through the junction zone block, and controlling to generate the vibration and the voice guidance message for an entry or exit direction, when the blind person walks passing through the junction neighboring zone block via the junction zone block; a voice memory 33 for storing the voice guidance message for an entry or exit direction; an audio processing unit 32 for speech-signal processing and outputting the voice messages stored in the voice memory 33 by controlling the control unit 30; an earphone 26 for outputting the audio signal for the voice guidance message outputted from the audio processing unit 32; a vibrator 23 for generating the vibration by controlling the control unit 30; and a buzzer 34 for generating sound effects by controlling the control unit 30.

As illustrated in FIG. 1, the plurality of blocks 14 is embedded on the sidewalk 10 for guiding the way to the blind person. The plurality of blocks 14 is usually paved on the sidewalk 10 where the blind people walks under his or her way, and the location information such as codes for distinguishing the junction zone block, the junction neighboring zone block or the general pedestrian zone block may be stored into the RFID tag 12, respectively. The plurality of blocks 14 are divided into the junction zone block 60, the junction neighboring zones 50A, 50B, 50C and 50D or the general pedestrian zone blocks 40A, 40B, 40C and 40D. If the blind person generally walks in the plurality of blocks 14, the control unit 30 controls to generate the vibration for informing the general pedestrian zone block 40A, 40B, 40C or 40D through the vibrator 23. When the blind person enters in the junction neighboring zone block 50A, 50B, 50C or 50D passing through any one zone block among the general pedestrian zone block 40A, 40B, 40C and 40D, the control unit 30 controls to generate both the vibration through the vibrator 23 and the sound effects by the buzzer 34. When the blind person enters in the junction zone block 60 passing through any one zone block among the junction neighboring zone block 50A, 50B, 50C or 50D, the control unit 30 controls to generate the vibration again through the vibrator 23 and the audio processing unit 32 outputs the voice message for informing the junction zone block 60, thereby listening for the blind person the corresponding message through the earphone 26. Thereafter, when the blind person enters any one zone block among the junction neighboring zone block 50A, 50B, 50C or 50D passing through the junction zone block 60, the control unit 30 controls to generate the vibration through the vibrator 23 and the audio processing unit 32 outputs the voice message for informing the junction neighboring zone, thereby listening for the blind person the corresponding message through the earphone 26.

As illustrated in FIGS. 1 to 3, the plurality of blocks 14 applied in the present invention may be inserted or paved in the sidewalk, hallways of a building, or subway stations with a cross(+)-shaped sidewalk of FIG. 1, a T-shaped sidewalk of FIG. 2, or a ¬ -shaped sidewalk of FIG. 3. Since the plurality of blocks 14 paved in the cross(+)-shaped sidewalk, the T-shaped sidewalk, or the ¬ -shaped sidewalk may be operated with same manner, it will be explained around the plurality of blocks 14 inserted or paved onto the cross(+)-shaped sidewalk in the preferred embodiment of the present invention.

The blind person may insert the earphone 26 into the earphone jack 25 and put on the earphone 26 onto his/her ear, then may walk along to the plurality of blocks 14 paved into the sidewalk 10 as moving his/her walking cane 20 in the up, down, left, or right direction. Then, the RF signal detector 28 may detect the location information stored in the corresponding RF tag 12 embedded into the plurality of blocks 14 through the antenna 21 installed in a front end of the walking cane 20. The location information detected in the RF signal detector 28 is converted into the digital signal in the A/D converting unit 29 and applied to the control unit 30. The control unit 30 may control to selectively output among the vibration, the vibration and the sound effects, or the vibration and the voice guidance message for the entry and exit direction depending on entering of the junction zone block 60, the junction neighboring zone block 50A, 50B, 50C or 50D, or the general pedestrian zone block 40A, 40B, 40C or 40D.

At this time, for example, the blind person enters in the general pedestrian zone block 40A toward to an walking direction from the direction of the entry and exit No. 2 at the Gangnam Subway Station as illustrated in FIG. 1, the control unit 30 controls to drive the vibrator 23 during passing through the general pedestrian zone block 40A of the walking direction. If the vibrator 23 generator the vibration, the blind person may feel the vibration and walk along the sidewalk 10 since he/she holds on the walking cane 20. Then, the blind person enters in the junction neighboring zone block 50A passing through the general pedestrian zone block 40A of the walking direction, the control unit 30 controls to generate both the vibration by driving the vibrator 23 and the sound effect by driving the buzzer 34. Then, the blind person may perceive that he/she is entered at the junction neighboring zone block 50 A. While the blind person enters in the junction zone block 60 passing through the junction neighboring zone block 50A, the control unit 30 controls to generate the vibration again by driving the vibrator 23 so that the blind person may listen the outputs the voice message for informing the junction zone block through the earphone 26 by controlling the audio processing unit 32. The voice guidance message, for example, may be outputted as "This is a junction zone block of Gangnam Subway Station." If the blind person passes the junction zone block 60 and touches the block 14 of the junction neighboring zone block 50C by using the walking cane 20, the control unit 30 controls to generate the vibration by driving the vibrator 23 and output the voice guidance message of the entry or exit direction, such as "This is Gangnam intersection direction", through the earphone 26 by controlling the audio processing unit 32. During the blind person is on walking in the junction neighboring zone block 50C passing through the junction zone block 60, the control unit 30 may control to generate the vibration by driving the vibrator 23 and continuously output the voice guidance message, such as "This is Gangnam intersection direction". Then, the blind person enters in the general pedestrian zone block 40C passing through the junction neighboring zone block 50C, the control unit 30 controls to generate the vibration by driving the vibrator 23. In this way, the blind person may walk to Gangnam intersection direction entering through the direction of the entry and exit No. 2 at the Gangnam Subway Station.

If the blind person enters from Nonhyun-Dong direction and wants to walk to the entry and exit No. 2 at the Gangnam Subway Station, the explanation will be follows:

As illustrated to FIG. 1, the blind person enters in the general pedestrian zone block 40D toward his or her walking direction from Nonhyun-Dong direction, the control unit 30 controls to generate the vibration by driving the vibrator 23 during passing through for the blind person the general pedestrian zone block 40D. Then, the blind person may walk to the desired place along the sidewalk 10 due to perceive the vibration when the vibrator 23 generates the vibration. The blind person enters in the junction neighboring zone block 50D passing through the general pedestrian zone block 40D, the control unit 30 controls to generate both the vibration again by driving the vibrator 23 and the sound effect by driving the buzzer 34. Then, the blind person can perceive that he/she is on entering in the junction neighboring zone block 50D toward the walking direction. Next, the blind person enters in the junction zone block 60 passing through the junction neighboring zone block 50D, the control unit 30 controls to generate the vibration by driving the vibrator 23 and to output the voice guidance message for informing that "He/she is on entering in the junction zone block 60" through the earphone 26 by controlling the audio processing unit 32. If the blind person turns right direction and touches the block 14 of the junction neighboring zone block 50A by using the walking cane 20, the control unit 30 controls to generate the vibration by driving the vibrator 23 and output the voice guidance message of the entry or exit direction, such as "This is an entry and exit No. 2 at the Gangnam Subway Station", through the earphone 26 by controlling the audio processing unit 32. During the blind person is on walking in the junction neighboring zone block 50A passing through the junction zone block 60, the control unit 30 may control to generate the vibration by driving the vibrator 23 and continuously to output the voice guidance message, such as "This is an entry and exit No. 2 at the Gangnam Subway Station". Then, the blind person enters in the general pedestrian zone block 40A passing through the junction neighboring zone block 50A, the control unit 30 controls to generate the vibration by driving the vibrator 23. In this way, the blind person may walk to the entry and exit No. 2 at the Gangnam Subway Station after entering from the direction of Nonhyun-Dong.

The blind person may walk in the junction zone block 60, the junction neighboring zone block 50A, 50B, 50C or 50D, or the general pedestrian zone block 40A, 40B, 40C or 40D along the sidewalk 10 as moving his/her walking cane 20 in the up, down, left, or right direction. If the blind person drifts off the junction zone block 60, the junction neighboring zone block 50A, 50B, 50C or 50D, or the general pedestrian zone block 40A, 40B, 40C or 40D on his or her way, both the outputs of the vibrator and the buzzer and the voice guidance message are stopped. Accordingly, the blind person may perceive that he or she is on the dangerous area and may walk into a boundary of the plurality of blocks 14.

In addition, while the blind person enters to the junction zone block 60 after passing through one zone among the junction neighboring zones 50A, 50B, 50C or 50D, but the blind person changes his or her way to enter one zone among the junction neighboring zone block 50A, 50B, 50C or 50D again, both the outputs of the vibrator and the buzzer and the voice guidance message are stopped, thereby not receiving the location information to guide to walk the desired place and perceiving that he or she is on the dangerous area. Accordingly, the blind person may listen the voice guidance message of the entry or exit direction, if only the blind person walks after passing one zone among the junction neighboring zones 50A, 50B, 50C or 50D and then enters other zone among the junction neighboring zones passing through the junction zone block 60.

Figure 6:
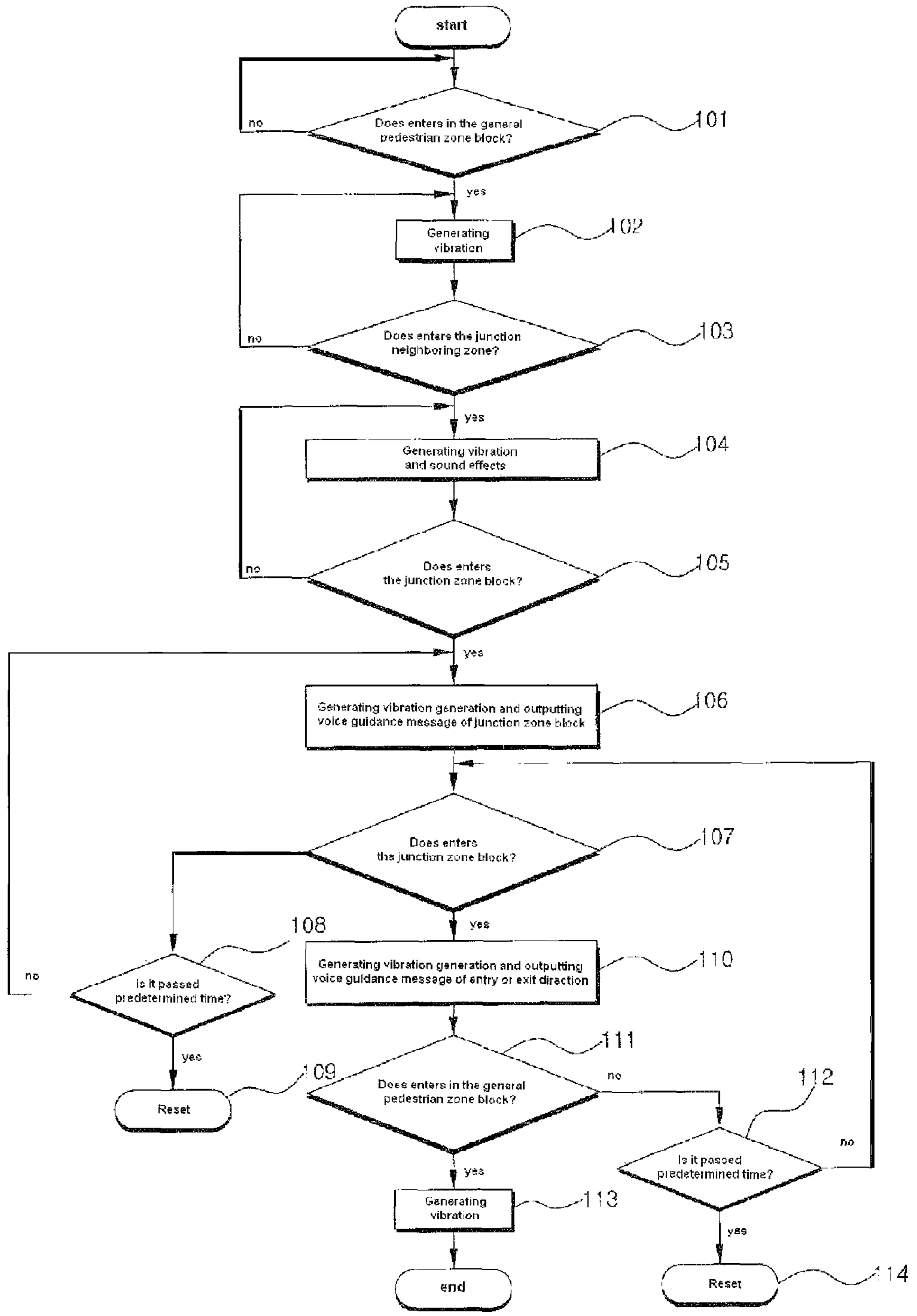
FIG. 6 is a flow chart of explaining a method for guiding the walking direction of the blind person according to a preferred embodiment of the present invention.

FIG. 6 is a flow chart of explaining a method for guiding the walking direction of the blind person according to a preferred embodiment of the present invention.

The operation for guiding the walking direction of the blind person of the preferred embodiment of the present invention will be described in detail with reference to FIG. 6. In step 101, the control unit 30 discriminates whether the blind people enters in any one zone block among the general pedestrian zone block 40A, 40B, 40C or 40D from the plurality of block 14 of the sidewalk 10, if the blind people enters in any one general pedestrian zone block as a discrimination result, the control unit 30 goes step 102. In step 102, the control unit 30 controls to generate the vibration by driving the vibrator 23. When the vibration is generated from the vibrator 23, the blind person may perceive the vibration through the walking cane 20 and may perceive the walking state on the blocks 14 of the sidewalk 10. After generating the vibration, if the blind person continuously walks along the sidewalk 10, the blind person will enter any one zone block among the junction neighboring zones 50A, 50B, 50C or 50D. At this stage, the control unit 30 discriminates whether the blind people enters in any one zone block among the junction neighboring zones 50A, 50B, 50C and 50D in step 103, if the blind people enters in any one junction neighboring zone, the control unit 30 goes step 104. In step 104, the control unit 30 controls to generate both the vibration by driving the vibrator 23 and the sound effect by driving the buzzer 34.

Next in step 105, the control unit 30 discriminates whether the blind people enters in the junction zone block 60 onto the sidewalk 10, if the blind people enters in the junction zone block, the control unit 30 goes step 106. In step 106, the control unit 30 controls to generate the vibration by driving the vibrator 23 and output the voice guidance message for informing the junction zone block 60 through the earphone by controlling the audio processing unit 32. The voice guidance message, for example, may be outputted as "It is a junction zone block at Gangnam Subway Station". Next, in step 107, the control unit 30 discriminates whether the blind people enters in any one zone block among the junction neighboring zones 50A, 50B, 50C or 50D in step 107, if the blind people enters in any one junction neighboring zone, the control unit 30 goes step 110. But if the blind people do not enter in any one junction neighboring zone, the control unit 30 goes step 108. At this time, the control unit 30 checks whether a predetermined time, for example 5 seconds, has passed or not. The predetermined time may be variously set between 3 seconds through 10 minutes. In a case that the blind person not only drifts off any one junction zone block and does not enter other junction neighboring zone block, but also the blind person does not any junction neighboring zone block within 5 seconds, the control unit 30 is reset with an initial state in step 109.

On the other hand, in step 110, the control unit 30 controls to generate the vibration by driving the vibrator 23 and output the voice guidance message informing the entry or exit direction through the earphone 26 by controlling the audio processing unit 32. In step 107, if the blind person enters in the junction neighboring zones 50A, the control unit 30 controls to generate the vibration by driving the vibrator 23 and output the voice guidance message such as "This is an entry and exit No. 2 at Gangnam Subway Station" by controlling the audio processing unit 32.

In step 107, if the blind person enters in the junction neighboring zone block 50B, the control unit 30 controls to generate the vibration by driving the vibrator 23 and output the voice guidance message such as "This is Yeoksam-Dong direction" by controlling the audio processing unit 32.

In step 107, if the blind person enters in the junction neighboring zone block 50C, the control unit 30 controls to generate the vibration by driving the vibrator 23 and output the voice guidance message such as "This is Gangnam intersection direction" by controlling the audio processing unit 32.

In step 107, if the blind person enters in the junction neighboring zone block 50A, the control unit 30 controls to generate the vibration by driving the vibrator 23 and output the voice guidance message such as "This is Nonhyun-Dong direction" by controlling the audio processing unit 32.

In step 111, the control unit 30 discriminates whether the blind people enters in any one zone block among the general pedestrian zone blocks 40A, 40B, 40C and 40D, if the blind people does not enter in any general pedestrian zone block, the control unit 30 goes step 112. At this time, the control unit 30 checks whether a predetermined time, for example 3 seconds, has passed or not. The predetermined time may be variously set between 3 seconds and 10 minutes. In case that the blind person drifts off any junction neighboring zone block and does not enter other general pedestrian zone block within 3 seconds, the control unit 30 is reset with the initial state in step 114.

In step 111, if the blind has entered to any one of general pedestrian zone blocks, the control unit 30 goes step 113 to control for generating the vibration by driving the vibrator 23.

As another embodiment of the present invention, the walking cane 20 may includes a history key. If the blind person presses the history key, the control unit 30 controls the audio processing unit 32 to output the voice guidance message for guiding a walking path which is already guided. For example, if the blind person has entered from Nonhyen-Dong direction and walks to the entry and exit No. 2 at the Gangnam Subway Station, the control unit 30 may output the voice guidance message, for example "You are walking to the entry and exit No. 2 at the Gangnam Subway Station after entering Nonhyun-Dong direction".

Although it is not described in the preferred embodiment of the present invention, the blind person may enter an area in which an elevator is installed, while the blind person is on passing any one zone block among the junction neighboring zones 50A, 50B, 50C or 50D after passing through the junction zone block 60, the control unit 30 controls to generate the vibration and output the voice guidance message, for example, "You are on the front of an elevator." thereby informing that the blind person is on the front of the elevator.

Although it is not described in the preferred embodiment of the present invention, the blind person may enter an area where an elevator is installed, while the blind person has been passing any one zone block among the junction neighboring zones 50A, 50B, 50C or 50D and enters in the area where the elevator is installed, the control unit 30 controls to generate the vibration and output the voice guidance message, for example, "You are on the front of an elevator." thereby informing that the blind person is on the front of the elevator.

At this time, the information regarding the elevator installation area is stored in the RFID tag of the plurality of blocks 14 paved in the sidewalk 10.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A system for guiding a walking direction of a blind person by using RFID (Radio Frequency Identification) blocks, the system comprising:

a plurality of RFID blocks having RFID tags embedded therein, the RFID blocks being paved in a sidewalk and divided into a junction zone block, a junction neighboring zone block and a general pedestrian zone block; and a walking cane for perceiving a walking guidance information from the plurality of RFID bocks and selectively outputting, a vibration signal, a sound effect or voice guidance message for guiding a walking direction;

wherein the walking cane comprises:

an antenna for receiving the walking guidance information from the junction zone block, the junction neighboring zone block or the general pedestrian zone block by means of wireless communication with the RFID tags;

a RF (Radio Frequency) signal detector for detecting and outputting information of the junction zone block, the junction neighboring zone block or the general pedestrian zone block received from the antenna;

an A/D (Analog/Digital) conversion unit for converting, the detected signal from the RF signal detector into a digital signal;

a control unit tier receiving the junction zone block, the junction neighboring zone block or the general pedestrian zone block which is converted, into the digital signal in the A/D conversion unit, controlling, to generate the vibration when the blind person walks through the general pedestrian zone block, controlling to generate both the vibration and the sound effect when the blind person walks through the junction neighboring zone, controlling to generate both the vibration and the voice guidance message announcing the junction zone block, when the blind person walks through the junction zone block, and controlling to generate both the vibration and the voice guidance message for an entry or exit direction, when the blind person walks through the junction neighboring zone block via the junction zone block;

a voice memory for storing the voice guidance message for the entry or exit direction, the voice guidance message for the entry or exit direction being outputted by controlling of the control unit;

an audio processing unit for speech-signal processing and outputting the voice messages stored in the voice memory by controlling of the control unit;

an earphone for outputting an audio signal for the voice guidance message outputted from the audio processing unit;

a vibrator for generating the vibration by controlling of the control unit; and a buzzer for generating the sound effects by controlling of the control unit.

2. A method for guiding the walking direction of the blind person by using RFID (Radio Frequency Identification) blocks in an walking direction guidance system including a plurality of RFID blocks having RFID tags embedded therein, the RFID block being paved in a sidewalk, and divided into a junction zone block, a junction neighboring zone block and a general pedestrian zone block, and a walking cane for perceiving a walking guidance information from the junction zone block, the junction neighboring zone block or the general pedestrian zone block and selectively outputting a vibration signal, a sound effect or voice guidance message for guiding a walking direction, the method comprising the steps of:

generating the vibration signal when the blind person walks through the general pedestrian zone block in the plurality of RFID blocks;

generating both the vibration signal and the sound effects when the blind person walks through the junction neighboring zone block after passing through the general pedestrian zone block in the plurality of RFID blocks;

generating both the vibration signal and the voice guidance message for informing the junction zone block when the blind person walks through the junction zone block in the plurality of RFID blocks;

generating, both the vibration signal and the voice guidance message of an entry or exit direction when the blind person walks through the junction neighboring zone block after passing the junction zone block in the plurality of RFID blocks; and generating the vibration signal when the blind person walks through the general pedestrian zone block in the plurality of RFID blocks.

3. The method for guiding the walking direction of the blind person as claimed in claim 2, the method further comprising a step of generating the vibration signal and the sound effects when the blind person has passed any one junction neighboring zone block and enters any other junction neighboring zone block without entering the junction zone block.

4. The method for guiding the walking direction of the blind person as claimed in claim 3, the method further comprising a step of resetting the walking cane as a initial state when the blind person does not enter to the junction neighboring zone block during a predetermined time after passing through the junction zone block in a state of drifting off the junction zone block.

5. The method for guiding the walking direction of the blind person as claimed in claim 4, the method further comprising a step of resetting the walking cane as a initial state when the blind person does not enter to the general pedestrian zone block and other junction neighboring zone block during a predetermined time after passing through the junction neighboring zone block via the junction zone in a state of drifting off the junction neighboring zone.

6. The method for guiding the walking direction of the blind person as claimed in claim 2, the method further comprising a step of resetting the walking cane as a initial state when the blind person does not enter to the junction neighboring zone block during a predetermined time after passing through the junction zone block in a state of drifting off the junction zone block.

7. The method for guiding the walking direction of the blind person as claimed in claim 6, the method further comprising a step of resetting the walking cane as a initial state when the blind person does not enter to the general pedestrian zone block and other junction neighboring zone block during a predetermined time after passing through the junction neighboring zone block in a state of drifting off the junction neighboring zone.

* * * * *